(12) United States Patent
Wiedemann et al.

(10) Patent No.: US 12,738,820 B2
(45) Date of Patent: Sep. 15, 2026

(54) METHOD FOR PRODUCING A PLUGGED WAVE WINDING

(71) Applicant: GROB-WERKE GmbH & Co. KG, Mindelheim (DE)

(72) Inventors: Stefan Wiedemann, Scherstetten (DE); Markus Schmölz, Rieden (DE); Manfred Ziegler, Hiltenfingen (DE)

(73) Assignee: GROB-WERKE GmbH & Co. KG, Mindelheim (DE)

( * ) Notice: Subject to any disclaimer, the term of this patent is extended or adjusted under 35 U.S.C. 154(b) by 663 days.

(21) Appl. No.: 18/152,886

(22) Filed: Jan. 11, 2023

(65) Prior Publication Data

US 2023/0231452 A1 Jul. 20, 2023

(30) Foreign Application Priority Data

Jan. 14, 2022 (DE) ......................... 102022100859.2
Mar. 7, 2022 (EP) .................................... 22160521

(51) Int. Cl.
*H02K 15/043* (2025.01)

(52) U.S. Cl.
CPC ................................ *H02K 15/0433* (2025.01)

(58) Field of Classification Search
CPC .... H02K 15/0433; H02K 15/066; H02K 3/28; H02K 15/0432
See application file for complete search history.

(56) References Cited

U.S. PATENT DOCUMENTS 5,609,187 A * 3/1997 Hachisuka ......... H02K 15/0433 140/92.2
6,223,784 B1 * 5/2001 Kirschner .......... H02K 15/0485 140/92.2

(Continued)

FOREIGN PATENT DOCUMENTS

DE 112019004024 T5 4/2021
WO 2019166060 A1 9/2019

(Continued)

OTHER PUBLICATIONS

European Search Report dated Sep. 30, 2022; priority document.

*Primary Examiner* — Thomas J Hong
*Assistant Examiner* — Jose K Abraham
(74) *Attorney, Agent, or Firm* — Greer, Burns & Crain, Ltd.

(57) ABSTRACT

A device and method for producing a plugged wave winding by plugging together first and second wave winding parts. A first receptacle receiving the first wave winding part includes elements for guiding first wave winding part straight wire sections. A second receptacle receives the second wave winding part and has elements for guiding second wave winding part straight wire sections. A device for bending portions of at least one of the wave winding parts is configured to displace one or more of the winding heads directed towards the other wave winding part to plug the wave winding parts together. A relative displacement device pushes and plugs the first and second wave winding parts into one another. The first and/or second guide elements are movable between a position for guiding the straight wire sections and a position for releasing the path of winding heads while plugging into one another.

8 Claims, 9 Drawing Sheets

(56) References Cited

U.S. PATENT DOCUMENTS

| | | | | |
|---|---|---|---|---|
| 7,269,888 | B2 * | 9/2007 | Neet | H02K 3/12 29/598 |
| 8,832,928 | B2 * | 9/2014 | Akimoto | H02K 15/0433 29/605 |
| 11,233,435 | B2 | 1/2022 | Yoon et al. | |
| 11,394,281 | B2 | 7/2022 | Schmid et al. | |
| 2009/0260222 | A1 * | 10/2009 | Akimoto | H02K 15/0433 29/605 |
| 2009/0276997 | A1 | 11/2009 | Akimoto et al. | |
| 2009/0320275 | A1 | 12/2009 | Dobashi et al. | |
| 2011/0041318 | A1 * | 2/2011 | Akimoto | H02K 15/0433 29/596 |
| 2011/0095639 | A1 * | 4/2011 | Nakamura | H02K 15/02 29/592.1 |
| 2020/0412214 | A1 * | 12/2020 | Schmid | H02K 15/0433 |

FOREIGN PATENT DOCUMENTS

| | | | | | |
|---|---|---|---|---|---|
| WO | WO-2019166061 | A1 * | 9/2019 | | H02K 3/28 |
| WO | 2020033858 | A1 | 2/2020 | | |
| WO | 2021175367 | A1 | 9/2021 | | |

* cited by examiner

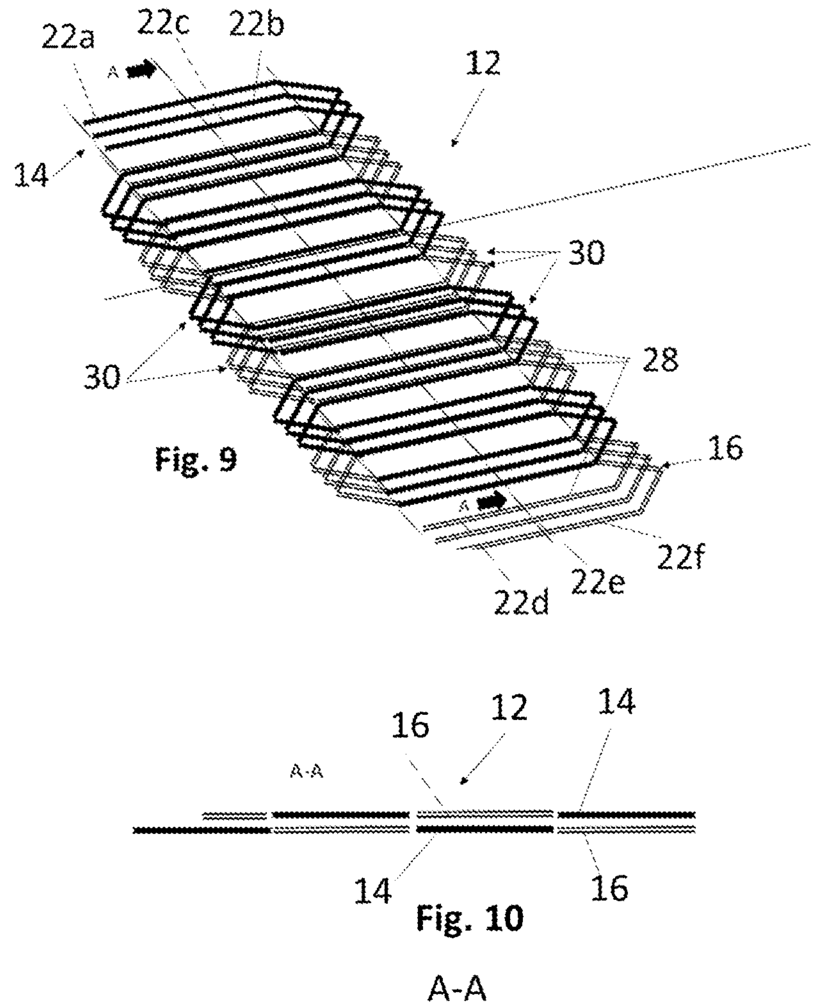
Fig. 9
Fig. 10
A-A
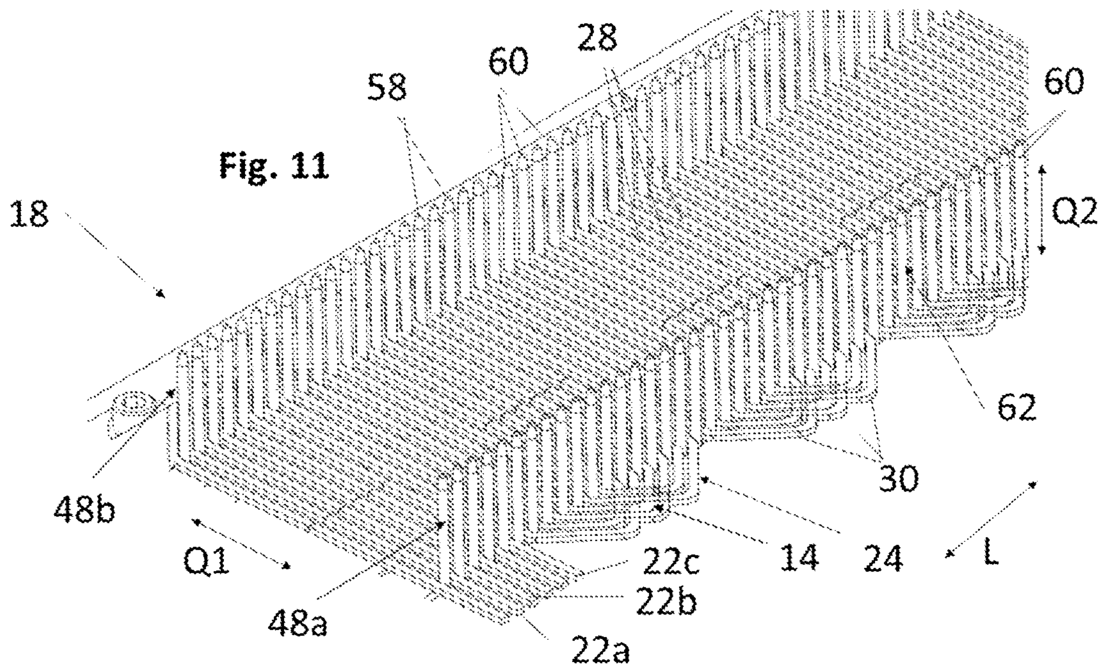
Fig. 11

METHOD FOR PRODUCING A PLUGGED WAVE WINDING

CROSS-REFERENCES TO RELATED APPLICATIONS

This application claims the benefit of the German patent application No. 102022100859.2, filed on Jan. 14, 2022, and of the European patent application No. 22160521.5 filed on Mar. 7, 2022, the entire disclosures of which are incorporated herein by way of reference.

FIELD OF THE INVENTION

The invention relates to an apparatus and a method for producing a plugged wave winding.

BACKGROUND OF THE INVENTION

For the technological background, reference is made to the following literature:

[1] WO 2019/166 060 A1

[2] WO 2019/166 061 A1

[3] WO 2020/033858 (corresponds to DE 11 2019 004 024 T5).

From documents [1] to [3], plugged wave windings as well as apparatus and methods for their manufacture are known.

Definition of Terms

A plugged wave winding is understood to be a conductor arrangement composed of plurality of wave winding wires by plugging, for forming a coil winding of an electrical machine. In preferred embodiments of the invention, the wave winding is formed as a winding mat for forming the coil winding of the electric machine. A winding mat is understood to mean a mat-shaped conductor bundle formed of a plurality of wave winding wires. A wave winding wire is understood to be a wave-like bent wire, usually having an outer insulating sheath, for example a film of plastic, extending in a longitudinal direction and having longitudinally spaced straight wire sections extending in a transverse direction transverse to the longitudinal direction and roof-shaped winding heads therebetween such that adjacent straight wire sections are connected to each other by a roof-shaped bent winding head. In the winding wire which is bent in a wave shape, the winding heads are alternately provided on one side or the other for connecting the straight wire sections. A wave of the wave winding wire has two straight wire sections and two winding heads, of which one winding head is provided on one side and another winding head is provided on the other side, bent in the opposite direction, in particular in a mirror image of the one winding head. A half wave has one or two straight wire sections with a winding head therebetween. The straight wire sections of the wave winding wires serve, in particular, to be inserted into grooves of a housing of a component of an electrical machine, such as, in particular, a stator of an electric motor. The winding heads each form a flip-over and, when used as intended in the housing of the component of the electrical machine, such as a laminated core of a stator or rotor, protrude externally at the axially directed housing ends and connect the wire section of one groove to a wire section in another groove. In particular, the wave winding wires have a core of electrically conductive material, such as copper in particular, preferably with a rectangular cross-section, and an insulation layer.

As can be seen in particular from documents [1] and [2], to which reference is expressly made for further details, a plugged wave winding is joined by plugging a plurality of wave winding wires or a plurality of wave winding wire arrangements, such as, in particular, partial mats of a winding mat into one another. For example, when two wave winding wires are plugged into one other, they are placed side by side, then mutually facing winding heads are displaced relative to each other in opposite directions extending substantially transverse to the longitudinal direction and substantially transverse to the straight wire sections and moved relative to each other substantially parallel to the straight wire sections to plug or insert the wave winding wires into one another. Similarly, a plurality of wave winding wire arrangements is plugged into one another.

Plugged wave windings have proven themselves and offer the essential advantages explained in documents [1] and [2] with respect to reliable industrial large-scale production of coil windings offering special electrical properties.

SUMMARY OF THE INVENTION

The invention is based on an object of providing an apparatus and a method with which the manufacture of such plugged wave windings can be further improved.

To achieve this object, the invention provides an apparatus and a method for manufacturing a plugged wave winding.

According to a first aspect, the invention provides an apparatus for manufacturing a plugged wave winding designed to form at least a part of a coil winding for a component of an electrical machine by plugging a first wave winding part together with a second wave winding part, wherein the first wave winding part is formed by at least a first wave winding wire and the second wave winding part is formed by at least a second wave winding wire, wherein the wave winding wires each extend in a longitudinal direction and have straight wire sections extending in a first transverse direction substantially transverse to the longitudinal direction and roof-shaped winding heads therebetween such that adjacent straight wire sections are interconnected by a winding head bent in a roof shape, the apparatus comprising:

a first receptacle for receiving the first wave winding part, the first receptacle having first guide elements for guiding straight wire sections of the first wave winding part, a second receptacle for receiving the second wave winding part, the second receptacle having second guide elements for guiding straight wire sections of the second wave winding part, a bending device for bending portions of at least one of the wave winding parts such that one or more of the winding heads directed to the other wave winding part are displaced in a second transverse direction extending substantially transverse to the longitudinal direction and transverse to the first transverse direction to plug the wave winding parts into one other, and a relative displacement device for sliding said first and second wave winding parts of said wave winding into one another so as to plug said wave winding parts into one another, wherein the first and/or the second guide elements are movable between a guide position for guiding the straight wire sections and a release position for releasing the path of winding heads in the course of the plugging into one another.

In a preferred embodiment, the bending device is designed for elastic bending.

The movable elements of the apparatus, such as in particular movable guide elements and movable elements such as punches or the like of the bending device, preferably each have at least one actuator or at least one actuator for groups of these elements to be moved synchronously, the actuators being further preferably connected to at least one electronic control unit which is designed to control the elements in a predetermined manner for guiding and/or bending or holding.

It is preferred that the first and/or second guide elements engage as primary guide elements in the guide position from one side extending in a second transverse direction in the associated wave winding part and are movable from the guide position in the direction towards this one side into the release position, and that in addition to the primary guide elements, secondary guide elements are provided which are movable between a release position for passing winding heads when sliding into one another and a guide position for guiding the straight wire sections. It is further preferably provided that the secondary guide elements in the guide position engage in the associated part of the wave winding from the other side extending in the second transverse direction opposite to the primary guide elements and are movable from the guide position in the direction towards this other side into the release position. In alternative embodiments, it is provided that the secondary guide elements or some of the secondary guide elements in the guide position engage in the associated part of the wave winding from one side extending in the second transverse direction in the same direction as the primary guide elements and are movable from the guide position towards said one side into the release position.

It is preferred that front guide elements are provided for engaging at front portions of the wave winding part to be guided facing the other wave winding part and rear guide elements are provided for engaging at rear portions of the first wave winding part facing away from the other wave winding part, the front and rear guide elements being movable differently to each other and/or independently of each other.

It is preferred that the first guide elements comprise front first guide elements for engaging at front portions of the first wave winding part facing the second wave winding part and rear first guide elements for engaging at rear portions of the first wave winding part facing away from the second wave winding part, wherein the front and rear first guide elements are movable differently with respect to each other and/or independently of each other.

It is preferred that the second guide elements comprise front second guide elements for engaging at front portions of the second wave winding part facing the first wave winding part and rear second guide elements for engaging at rear portions of the second wave winding part facing away from the first wave winding part, wherein the front and rear second guide elements are movable differently with respect to each other and/or independently of each other.

It is preferred that the primary guide elements have front primary guide elements for engaging at front portions of the wave winding part to be guided facing the other wave winding part and rear primary guide elements for engaging at rear portions of the wave winding part to be guided facing away from the other wave winding part, the front and rear primary guide elements being movable differently to each other and/or independently of each other.

It is preferred that the secondary guide elements have front secondary guide elements for engaging at front portions of the wave winding part to be guided facing the other wave winding part and rear secondary guide elements for engaging at rear portions of the wave winding part to be guided facing away from the other wave winding part, the front and rear secondary guide elements being movable differently to each other and/or independently of each other.

It is preferred that the first and/or second receptacles have a rake or comb-like structure with pins, the pins being movable and forming the guide elements.

It is preferred that the relative displacement device comprises at least one slider for relative insertion of one of the wave winding parts in the first transverse direction into the other of the wave winding parts.

It is preferred that the bending device is designed to bend the portions on the first wave winding part, and the relative displacement device is designed to insert the second wave winding part into the elastically bent first wave winding part.

It is preferred that the apparatus has at least one movable punch that is further preferably designed to be movable in a second transverse direction, and is designed for a movement occurring in a predetermined manner, in particular by means of an actuator that is further preferably connected to a corresponding electronic control unit. For example, the punch can be designed to hold at least one of the wave winding parts in its position. However, the at least one punch or at least one of a plurality of punches can also be designed for bending and thus form part of the bending device.

It is preferred that the bending device comprises at least one punch movable in a second transverse direction.

It is preferred that the bending device comprises at least one first punch on a first side, which is designed for displacing a first part of the winding heads of the wave winding part to be elastically bent in a first of the two second transverse directions.

It is preferred that the bending device has at least a second punch on a second side, which is designed for displacing a second part of the winding heads of the wave winding part to be preferably elastically bent in a second of the two second transverse directions or also for holding the second part of the winding heads.

It is preferred that the guide elements are movable in groups.

It is preferred that the guide elements are linearly movable.

It is preferred that the guide elements are pivotally movable.

It is preferred that the apparatus is designed in such a way that each straight wire section or at least each half-wave with two adjacent straight wire sections and a winding head in between is guided by at least one guide element at any time of the plugging operation.

It is preferred that at least some of the guide elements are also movable in the first transverse direction.

A preferred embodiment of the apparatus comprises an electronic control unit configured to automatically control the apparatus to perform the plugging operation. The control unit can be implemented in particular by software and/or hardware. The control unit can be provided decentralized on the apparatus or may be part of a control system of a larger industrial plant, such as a manufacturing plant for manufacturing a component of an electrical machine. Preferably, the apparatus is designed to be integrated in such a manufacturing plant.

According to a further aspect, the invention provides a method of manufacturing a plugged wave winding adapted to form at least part of a coil winding for a component of an electrical machine by plugging together a first wave winding part with a second wave winding part, wherein the first wave winding part is formed by at least one first wave winding wire and the second wave winding part is formed by at least one second wave winding wire, wherein the wave winding wires each extend in a longitudinal direction and have straight wire sections extending in a first transverse direction substantially transverse to the longitudinal direction and roof-shaped winding heads therebetween such that adjacent straight wire sections are interconnected by a winding head bent in roof-shape, the method comprising:

providing the first wave winding part and first guide elements for guiding straight wire sections of the first wave winding part during the plugging operation, providing the second wave winding part and second guide elements for guiding straight wire portions of the second wave winding part during the plugging operation, bending portions of at least one of the wave winding parts such that one or more of the winding heads facing the other wave winding part are displaced in a second transverse direction extending substantially transverse to the longitudinal direction and transverse to the first transverse direction for plugging the wave winding parts into one another, and pushing the first and second wave winding parts of the wave winding into one another while being guided with the guide elements so as to plug the wave winding parts into one another, wherein the first and second guide elements are moved from a guide position, in which they guide the straight wire sections, to a release position for releasing the path of the winding heads for passing winding heads in the course of the plugging into one another.

In a particularly preferred embodiment of the method, bending is performed elastically. However, inelastic bending, for example with subsequent bending back, is also possible.

Preferably, the method comprises the step of:

guiding the movement of at least one of the wave winding parts with primary guide elements extending from one side into the wave winding part to be guided, and secondary guide elements extending from the other side into the wave winding part to be guided during plugging, wherein the primary and secondary guide elements are transferred to the release position at different times of the plugging operation, so that guiding is permanently provided.

Preferably, the method comprises the step of:

guiding the movement of at least one of the wave winding parts with the first and second guide elements as primary guide elements and additionally with secondary guide elements during plugging, wherein the primary and secondary guide elements are transferred to the release position at different times of the plugging operation, so that guidance is permanently provided.

Preferably, the method comprises the step of:

guiding the movement of at least one of the wave winding parts with front guide elements located closer to the other wave winding part and rear guide elements located further away from the other wave winding part during plugging, wherein the front and rear guide elements are transferred to the release position at different times of the plugging operation.

Preferably, each straight wire section or at least each half-wave having two adjacent straight wire sections and a winding head therebetween is guided by at least one guide element at each time of the plugging operation.

Preferably, the method comprises the step of:

a) providing single wires or partial mats as a first wave winding portion and a second wave winding portion, such that the first and second wave winding parts are adjacent to each other in the first transverse direction and are aligned with their longitudinal directions.

Preferably, the method comprises the step of:

b) raising or lowering a first portion or a first half of the winding heads of the first wave winding part.

In one embodiment of the method, a second portion or a second half of the winding heads of the first wave winding part can be kept stationary or can be moved in the opposite direction to the first portion, depending on the plugging operation. Optionally, the method thus includes the step of:

c) lowering or raising or holding in position a second portion or a second half of the winding heads of the first wave winding part.

Preferably, the method comprises the step of:

d) pushing the second wave winding part in the first transverse direction into the first wave winding part.

Preferably, the method comprises the step of:

e) releasing the respective bent portion of the first wave winding part so that it moves back towards its initial position, or moving the respective bent portion of the first wave winding part back towards its initial position.

Preferably, the method comprises the step of:

f) holding the first wave winding part and guiding the movement of the second wave winding part with the guide elements, preferably in such a way that they are moved into a release position only when passing a winding head.

Preferably, the method comprises the step of:

g) guiding the wave winding part to be guided with a plurality of rows of pins movable in a direction of which at least one direction component runs along the center axis of the pin.

In a preferred embodiment of the method, steps a), b), d), e) are carried out successively. Optionally, step c) can be carried out preferably simultaneously with step b) or immediately before or after it.

Preferably, the method comprises the step of:

aligning at least one of the wave winding parts or the plugged wave winding mat by moving at least some of the guide elements in the first transverse direction.

According to a further aspect, the invention provides a computer program comprising instructions for causing the apparatus according to any one of the preceding embodiments to perform the steps of the method according to any one of the preceding embodiments.

In preferred advantageous embodiments of the invention, guidance is provided. Preferably, an automated and process-safe plugging procedure is performed.

According to the invention, apparatus and methods are created with which plugged wave winding mats can be produced in an automated and process-safe manner. In particular, guide elements are provided for guiding parts of wave winding parts to be plugged, which advantageously move in a preferably automated and computer-implemented controlled manner.

In preferred embodiments, only elastic and no plastic deformation of one or both parts of the wave winding to be plugged together takes place.

In contrast to these particularly preferred embodiments of the method and apparatus for producing plugged wave winding mats, in document [3] the wires are plastically deformed, namely bent upwards by 90°, so that the partial mat/wires to be "plugged in" can be inserted from above. Although plastic deformation of the wires is also possible in principle in some embodiments of the invention, it is less preferred because, depending on the extent of the plastic deformation, there is a relatively large potential for damage to the insulation at the bending points. There is also the possibility of permanent deformation, which is disadvantageous for subsequent processes. Therefore, in preferred embodiments, the bending device or bending are designed in such a way that the portions of the wave winding parts to be bent are bent elastically. If the bent parts are relieved of load, for example by returning punches or the like, the elastically bent portions bend back to their original shape.

The basic plugging principle, which can also be carried out in embodiments of the invention, is described in document [1] (WO2019166060) and shown in the Figures shown therein. Explicit reference is made to this document [1] for further details, including possible embodiments of the wave winding parts and the wave winding wires, which document is incorporated by reference and forms part of the present disclosure. However, document [1] does not have any guides, and it is left open as to how a plugging operation could be automated.

Advantageous embodiments of the invention allow a plugging principle with preferably elastic "bending" (e.g., raising or alternatively also lowering, depending on the orientation of the apparatus also movements in other directions) of the wires, preferably guiding the wires at any time.

Since the wires of the wave winding have a large number of bends, a spring-back effect can occur after 2D bending, which results in the wires not remaining in defined positions. In order to avoid wire crossings and damage and to ensure a stable process, advantageous embodiments provide that the wires are guided at all times; even during the plugging operation.

In prior art, the wires must be displaced laterally during the plugging operation if the wires are only lifted elastically. In this case, however, guides would intersect with the curved "roof geometry" of the wire. The plugging operation is thus not possible in this manner with fixed guides.

Advantageous embodiments of the invention, on the other hand, enable a process-safe and also automated plugging operation of the parts of a plugged wave winding to be plugged together.

In apparatus and methods according to the invention, movable guides are provided for guiding at least one of the parts of the wave winding during the plugging operation.

Preferred embodiments provide in particular one or more or all of the following advantages:

- automatable plugging operation
- safe process control
- guiding of the parts by movable guides which can move out of the way of the parts to be plugged during plugging
- preferably no plastic deformation of the wires
- less potential for damage to the insulation
- no permanent deformation
- more stable downstream processes.

BRIEF DESCRIPTION OF THE DRAWINGS

Embodiments of the invention will be explained in more detail below with reference to the accompanying drawings.

FIG. 9 is a perspective view of the plugged wave winding mat produced by plugging the first wave winding part and the second wave winding part together employing the steps of FIGS. 1 to 8;

FIG. 10 is a view of the wave winding mat along line A-A of FIG. 9;

FIG. 11 is a perspective view of a part of an embodiment of an apparatus for producing a plugged wave winding mat by plugging together wave winding parts;

DETAILED DESCRIPTION OF THE PREFERRED EMBODIMENTS

Figure 1:
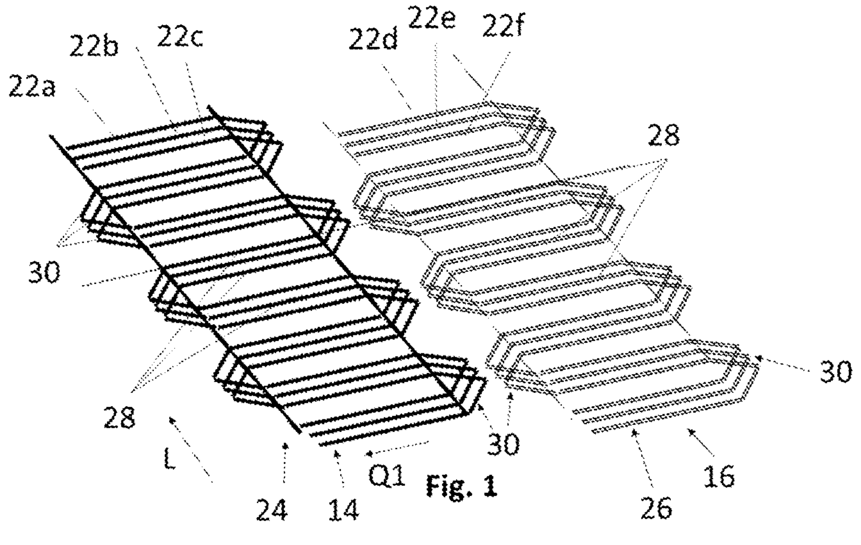
FIG. 1 is a perspective view of an arrangement comprising a first wave winding part and a second wave winding part for illustrating a first step of a method according to a preferred embodiment for producing a plugged wave winding mat by plugging the wave winding parts together.

In the following, preferred embodiments of a method and an apparatus 10 for producing a plugged wave winding 12 are explained in more detail with reference to the illustrations in the accompanying Figures. In this regard, FIGS. 1 to 10 show schematic representations of an arrangement comprising a first wave winding part 14 and a second wave winding part 16 in various steps of the method in which the wave winding parts 14, 16 are plugged together to form the plugged wave winding 12. FIG. 11 shows a perspective view of a first receptacle 18 of the device 10; and FIGS. 12 to 25 show schematic representations of the device 10 in a side view during different steps of a particularly preferred embodiment of the method.

The Figures show a method and a device 10 for manufacturing a plugged wave winding 12 adapted to form at least part of a coil winding for a component of an electrical machine.

In particular, the wave winding 12 is formed by a wave winding mat 20 made by plugging and composed of a plurality of wave winding wires 22, 22*a*-22*f*.

The wave winding 12 is formed by plugging together a first wave winding part 14 with a second wave winding part 16.

The first wave winding part 14 is formed by at least a first wave winding wire 22*a*-22*c*. For example, the first wave winding part 14 may be formed by a group of first wave winding wires 22*a*-22*c* that are already assembled into a first partial mat 24.

The second wave winding part 16 is formed by at least one second wave winding wire 22*d*-22*f*. For example, the second wave winding part 16 may be formed by a group of second wave winding wires 22*d*-22*f* that are already assembled into a second partial mat 26.

The wave winding wires 22*a*-22*f* each extend in a longitudinal direction L. The wave winding wires 22*a*-22*f* have straight wire sections 28 extending in a first transverse direction Q1 extending substantially transverse to the longitudinal direction L. The wave winding wires 22*a*-22*f* have roof-shaped winding heads 30 between the straight wire sections such that adjacent straight wire sections 28 are interconnected by a winding head 30 bent in a roof shape. In an exemplary later intended use of the wave winding 12 in a stator of an electric motor, the wave winding wires extend with their longitudinal direction L in the circumferential direction and the straight wire sections 28 extend substantially in the axial direction (with respect to the axis of the stator/electric motor).

Figure 2:
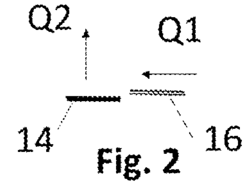
FIG. 2 is a side view of the arrangement of FIG. 1.

In the following, the basic procedure of the plugging operation is explained in more detail with reference to the illustrations in FIGS. 1 to 10. First, as shown in FIGS. 1 and 2, the first wave winding part 14 and the second wave winding part 16 are provided. Single wires—wave winding wires 22*a*-22*f*—or partial mats 24, 26 can be provided as wave winding parts 14, 16. In FIGS. 1 to 10, a possible example of the plugging operation with two partial mats 24, 26 is shown; analogously, the plugging operation can also be performed with single wires. An example of a plugging operation of partial mats 24, 26 with a possible change of position is shown, but the change of position can also take place in different patterns, as this is shown and described in detail in document [1], to which reference is expressly made for further details.

According to FIGS. 1 and 2, the wave winding parts 14, 16 are provided lying side by side so that they extend side by side substantially parallel in the longitudinal direction and are laterally spaced apart in the first transverse direction Q1.

Figure 3:
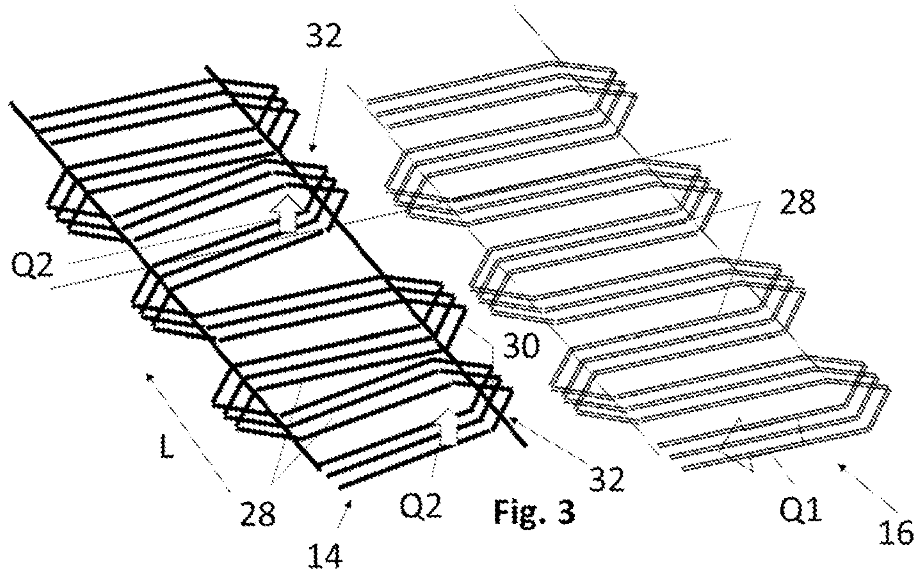
FIG. 3 is a perspective view comparable to FIG. 1 to illustrate a second step of the method.
Figure 4:
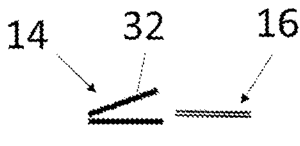
FIG. 4 is a side view of the arrangement of FIG. 3.

According to FIGS. 3 and 4, portions 32 of the first wave winding part 14 are then deflected in a second transverse direction Q2 extending transversely to the longitudinal direction L and the first transverse direction Q1. The deflection preferably takes place elastically. In the embodiments shown, the wave winding parts 14, 16 are provided with their longitudinal direction L extending in a horizontal direction such that their straight wire section 28 extends in the horizontal direction other than the first transverse direction Q1. The portion 32 is then raised, for example, i.e., the second transverse direction Q2 is the vertical direction in the illustrated embodiments. In the illustrative embodiment shown, the portion 32 has a portion, for example every other one, of the winding heads 30 of the first wave winding portion 14 located near the second wave winding portion 16. The portion 32 may also be formed by a different group of the winding heads 30 located near the second wave winding part 16, depending on the position change pattern. Accordingly, FIGS. 3 and 4 show a step of bending, preferably elastic bending, of portions 32 of at least one, 14, of the wave winding parts 14, 16 such that one or more of the winding heads 30 directed towards the other wave winding part 16 are displaced in a second transverse direction Q2 extending substantially transversely to the longitudinal direction L and transversely to the first transverse direction Q1 for plugging the wave winding parts 14, 16 into one another.

Figure 5:
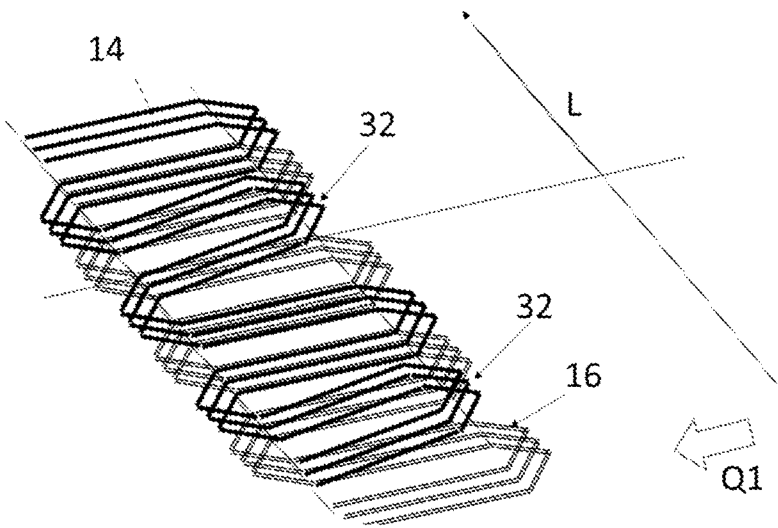
FIG. 5 is a perspective view comparable to FIG. 3 to illustrate a third step of the method.
Figure 6:
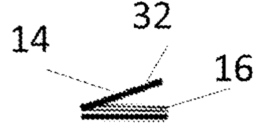
FIG. 6 is a side view of the arrangement of FIG. 5.

Referring to FIGS. 5 and 6, the wave winding parts 14, 16 are then pushed into each other. For example, the second wave winding part 16 is pushed laterally into the first wave winding part 14 in which the portion 32 of the winding heads 30 is raised. In particular, FIGS. 5 and 6 show an embodiment of the step of pushing the first and second wave winding parts 14, 16 of the wave winding into each other so as to insert the wave winding parts into one another. In particular, the relative movement of the wave winding parts 14, 16 takes place substantially in the first transverse direction Q1 (oblique movement is also possible).

Figure 7:
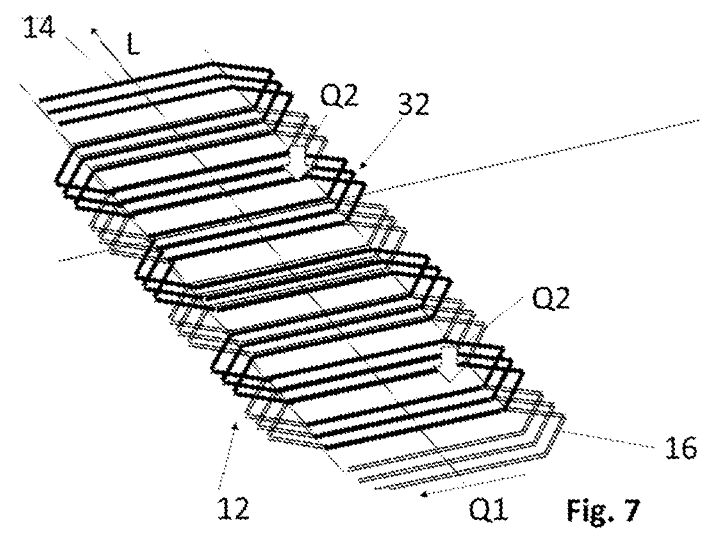
FIG. 7 is a perspective view comparable to FIG. 5 to illustrate a fourth step of the method.
Figure 8:
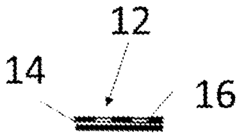
FIG. 8 is a side view of the arrangement of FIG. 7.

According to FIGS. 7 and 8, the first wave winding part 14 is subsequently deposited. In particular, the portion 32 of the first wave winding part 14 that has been displaced in the second transverse direction Q2 is returned to its initial position in the direction of the second transverse direction Q2. If bending took place elastically—as is preferred—a bending force imposed for this purpose is simply released, so that the portion 32 moves back again elastically. If bending took place in the plastic region, a counterforce is applied to bend it back.

FIGS. 9 and 10 then show the plugged wave winding 12 produced by the plugging operation according to FIGS. 1 to 8 in the form of the wave winding mat 20 extending in the longitudinal direction L, with the straight wire sections 28 of the individual plugged-together wave winding wires 22*a*-22*f* facing in the first transverse direction Q1. This wave winding 12 can then be used as a coil winding for a component of an electrical machine (not shown). For example, the wave winding 12 is inserted into a stack of laminations of a stator with the straight wire sections 28 inserted into grooves of the stack of laminations.

In the following, embodiments of methods and apparatus 10 are explained in more detail with reference to the illustration of FIGS. 11 to 25, with which the plugging operation previously explained in terms of basic structure with reference to FIGS. 1 to 10 can be easily and reliably automated.

As shown in particular in FIG. 11, the apparatus 10 has a first receptacle 18 for receiving the first wave winding part 14 and a second receptacle 34, which is not shown in FIG. 11 but is of analogous design (in particular, complementary or mirror image), for receiving the second wave winding part 16.

Figure 12:
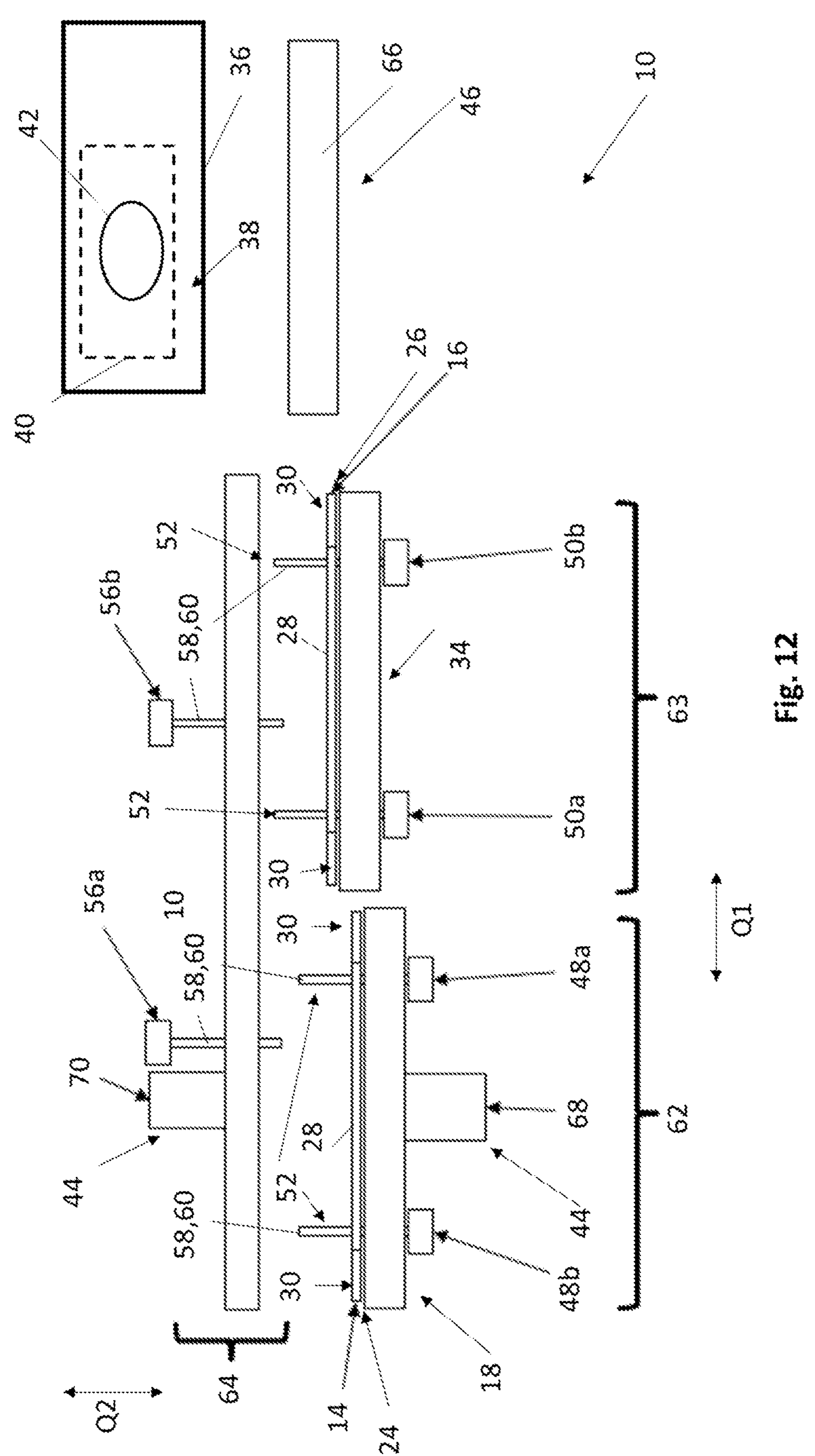
FIG. 12 is a schematic outline of an embodiment of the apparatus as seen from the side during a first step of a preferred embodiment of the method for producing the plugged wave winding mat.

FIG. 12 shows a schematic outline of an embodiment of the apparatus 10 during the step of providing the first and second wave winding parts 14, 16. In FIGS. 13 to 25, the apparatus 10 is shown performing further steps of the method.

As indicated in FIG. 12, the apparatus 10 includes an electronic control unit 36 configured to control the apparatus 10 to perform these steps. The electronic control unit 36 may be implemented in hardware and/or in software. In particular, the electronic control 36 comprises an electronic data processing unit 38, the memory 40 of which contains a computer program 42 with machine-readable instructions that cause the apparatus 10 to perform the steps of the method as explained in more detail below with reference to FIGS. 12 to 25. For this purpose, movable elements—i.e., in particular, guide elements 48*a*, 48*b*, 50*a*, 50*b*, 56*a*, 56*b*, sliders 66 and punches 68, 70, elements for moving apparatus parts such as receptacles 18, 34 and lids 64—of the apparatus 10 can each be actuated by actuators not shown in greater detail, which can be controlled by the control unit 36. The actuators may be, for example, electrical, hydraulic, pneumatic actuators. In particular, groups of movable elements that are to be moved together can also be driven by a common actuator; in other embodiments, an actuator is provided for each element, whereby groups of actuators can be controlled by the control unit 36 for joint movement in order to move groups of movable elements of the device together.

First, with reference to FIGS. 11 and 12, the further structure of a preferred embodiment of the apparatus 10 is explained in more detail, before the process flow is explained with reference to FIGS. 13 to 25.

The device 10 is arranged to produce the plugged wave winding 12, which is arranged to form at least part of a coil winding for a component of an electrical machine, by plugging together the first wave winding part 14 and the second wave winding part 16. As explained above, the first wave winding part 14 is formed by at least one first wave winding wire 22*a*-22*c*, and the second wave winding part 16 is formed by at least one second wave winding wire 22*d*-22*f*. As explained above, the wave winding wires 22*a*-22*f* have the straight wire sections 28 extending in a first transverse direction Q1 substantially transverse to the longitudinal direction L of the wave winding parts 14, 16, and the roof-shaped winding heads 30 therebetween such that adjacent straight wire sections 28 are interconnected by a winding head 30 bent in a roof shape.

The apparatus 10 comprises first receptacle 18, the second receptacle 34, a bending device 44, and a relative displacement device 46.

The first receptacle 18 is configured to receive the first wave winding part 14. The first receptacle has first guide elements 48*a*, 48*b* for guiding straight wire sections 28 of the first wave winding part 14.

The second receptacle 34 is configured to receive the second wave winding part 16. The second receptacle 34 has second guide elements 50*a*, 50*b* for guiding straight wire sections 28 of the second wave winding part 16.

The bending device 44 is configured for bending, in particular for elastically bending, the portions 32 of at least one, 14, of the wave winding parts 14, 16. In particular, the bending device 44 is configured such that one or more of the winding heads 30 directed towards the other wave winding part 16 are displaced by bending in the second transverse direction Q2, which extends substantially transversely to the longitudinal direction L and transversely to the first transverse direction Q1, in order to allow the wave winding parts 14, 16 to be plugged into one another.

The relative displacement device 46 is configured to push the first and second wave winding parts 14, 16 of the wave winding 12 into each other so as to insert the wave winding parts 14, 16 into one another.

The first guide elements 48*a*, 48*b* and/or the second guide elements 50*a*, 50*b* are movable between a guide position 52 and a release position 54.

In the guide position 52, the guide elements 48*a*, 48*b*, 50*a*, 50*b* are arranged to guide the associated straight wire sections 28 in the course of the plugging into one another.

In the release position 54, the guide elements 48*a*, 48*b*, 50*a*, 50*b* release the path of winding heads 30 in the course of the plugging into one another.

In addition to primary first and second guide elements 48*a*, 48*b*, 50*a*, 50*b* that can move from the guide position 52 to the release position by moving substantially in one of the two second transverse directions Q2, the apparatus 10 according to the illustrated embodiment also comprises secondary guide elements 56*a*, 56*b* that can move from the guide position 52 to the release position 54 by moving substantially in the opposite direction—the other of the two second transverse directions Q2. This opposing movement of the primary and secondary guide elements 48*a*, 48*b*, 50*a*, 50*b*, 56*a*, 56*b* is only an optional feature. In other embodiments of the apparatus 10 not shown in detail, both the primary guide elements 48*a*, 48*b*, 50*a*, 50*b*, and some or all of the secondary guide elements 56*a*, 56*b* engage from the same side and/or are movable from the guide position 52 to the release position 54 by movements in the same direction.

The guide elements 48*a*, 48*b*, 50*a*, 50*b*, 56*a*, 56*b* can be any guides that perform the above functions. For example, projections 58 in the form of pins 60, plates, washers, wedges, forked formations, groove boundaries with a guide groove therebetween, etc., may be disposed to the left and right of the straight wire section 28 to be guided in the guide position 52 and may be retracted from engagement between straight wire sections 28 in the release position 54.

In the illustrated embodiments, the receptacles 18, 34 have as guide elements 48*a*, 48*b*, 50*a*, 50*b*, 56*a*, 56*b* respective rows of pins 60 which are movable individually or in groups in their longitudinal direction (which here extends substantially in the second transverse direction Q2) by means of associated actuators controlled by the control unit 36, not shown here. Thus, the pins 60 representing the primary first guide elements 48*a*, 48*b* of the first receptacle 18 can be moved into the guide position 52 shown in FIG. 11 and transferred from this guide position 52 here downward into the release position 54. FIG. 11 shows the first receptacle 18 and the first partial mat 24 as an example of the first wave winding part 14, with the first guide elements 48*a*, 48*b* all shown in the guide position 52. The first receptacle 18 is shown here as a first comb-like structure or first rake 62 having a first row of pins 60 and a second row of pins 60. The first row of pins 60 is an example of front first guide elements 48*a*, while the second row of pins 60 is an example of rear first guide elements 48*b*. Accordingly, the second receptacle 34 is also formed as a second rake 63 having a first row of pins 60 and a second row of pins that are examples of front and rear second guide elements 50*a*, 50*b*, such that the second guide elements 50*a*, 50*b* also have front second guide elements 50*a* and rear second guide elements 50*b*, see FIG. 12.

As further shown in FIG. 12, the first guide elements 48*a*, 48*b* of the first receptacle 18 engage in the first wave winding portion 14 as primary first guide elements 48*a*, 48*b* in the guide position 52 from one (first) side (in this case from below) extending in a second transverse direction Q2 and are movable from the guide position 52 toward said one side (i.e., downward in this case) into the release position 54. Further, the second guide elements 50*a*, 50*b* of the second receptacle 34 engage in the second wave winding part 16 as primary second guide elements 50*a*, 50*b* in the guide position 52 from the one (first) side (in this case from below) extending in the second transverse direction Q2 and are movable from the guide position 52 towards this one (first) side into the release position 54 (i.e., downward in this case).

Further, the apparatus 10 has secondary guide elements 56*a*, 56*b* which are also movable between a release position 54 for passing winding heads 30 during pushing into one another and a guide position 52 for guiding the straight wire sections 28. Secondary first guide elements 56*a* extend in the guide position 52 from the other (second) side (in this case from above) in the second transverse direction Q2 opposite to the primary first guide elements 48*a*, 48*b* and engage in the first wave winding part 14 from this other side (in this case from above) and are movable from the guide position 52 towards this other side (in this case upwards) into the release position 54. Secondary second guide elements 56*b* extend in the guide position 52 from the other (second) side (in this case from above) in the second transverse direction Q2 opposite to the primary second guide elements 50*a*, 50*b* and engage in the second wave winding part 16 from this other side (in this case from above) and are movable from the guide position 52 in the direction towards this other side (in this case upwards) into the release position 54.

In the embodiments shown, the device has a cover 64 on which the secondary guide elements 56*a*, 56*b* are movably mounted. Preferably, the receptacles 18, 34 are both or individually movable relative to the cover 64 and/or relative to each other, in particular in the second transverse direction Q2, i.e., in this case, for example, in the height direction.

Accordingly, the apparatus 10 comprises front guide elements 48*a*, 50*a* and rear guide elements 48*b*, 50*b*. The front guide elements 48*a*, 50*a* are designed to engage at front regions of the wave winding part 16, 14 to be guided. In this context, front areas are defined as the areas located at the front in the direction of the plug-in movement and facing the respective other wave winding part. The rear guide elements 48*b*, 50*b* are designed to engage at rear regions (with respect to the plug-in movement direction) of the respective wave winding part 16, 14 to be guided. The rear portions of one wave winding part 16, 14 face away from the other wave winding part 14, 16. The front 48*a*, 50*a* and rear 48*b*, 50*b* guide elements are movable differently to each other and independently of each other.

In particular, the first guide elements 48*a*, 48*b* have front first guide elements 48*a* for engaging at front portions of the first wave winding part 14 facing the second wave winding part 16 and rear first guide elements 48*b* for engaging at rear portions of the first wave winding part 14 facing away from the second wave winding part 16, the front and rear first guide elements 48*a*, 48*b* being movable differently to each other and independently of each other. The secondary guide elements 50*a*, 50*b* have front secondary guide elements 50*a* for engaging at front portions of the second wave winding part 16 facing the first wave winding part 14 and rear secondary guide elements 50*b* for engaging at rear portions of the second wave winding part 16 facing away from the first wave winding part 14, the front and rear secondary guide elements 50*a*, 50*b* being movable differently to each other and independently of each other.

The primary guide elements 48*a*, 48*b*, 50*a*, 50*b* have front primary guide elements 48*a*, 50*a* for engaging at front portions of the wave winding part 16, 14 facing the other wave winding part 14, 16 and rear primary guide elements 48*b*, 50*b* for engaging at rear portions of the wave winding part 16, 14 facing away from the other wave winding part 14, 16, wherein the front 48*a*, 50*a* and rear 48*b*, 50*b* primary guide elements are movable differently to each other and independently of each other.

With respect to guiding the second wave winding part 16, the secondary guide elements 56*a*, 56*b* have front secondary guide elements 56*a* for engaging at front portions of the wave winding part 16 to be guided facing the other wave winding part 14 and rear secondary guide elements 56*b* for engaging at rear portions of the wave winding part 16 to be guided facing away from the other wave winding part 14, the front 56*a* and rear 56*b* secondary guide elements being movable differently with respect to and independently of each other.

The relative displacement device 46 comprises at least one slider 66 configured to push one of the wave winding parts 14, 16, in this case in particular the second wave winding part 16, in the first transverse direction Q1 into the other of the wave winding parts 14, 16, in this case, in particular, the first wave winding part 14.

In the embodiment shown, the bending device 44 is designed for bending the partial regions 32 on the first wave winding part 14. For this purpose, the bending device 44 comprises at least one punch 68, 70 movable in a second transverse direction Q2. In particular, the bending device 44 has at least one first punch 68 on a first side, which is designed for displacing a first part of the winding heads 30 of the wave winding part 14, which is preferably to be bent elastically, in a first of the two second transverse directions. In the illustrated embodiment, the first punch 68 is associated with the first receptacle 18 and passes through a base portion of the first receptacle 18 moving from bottom to top for bending. The bending device has at least one second punch 70 on a second side. In the illustrated embodiment, the second punch 70 is mounted on the cover 64 and is movable from top to bottom to engage at the first wave winding part 14. In particular, the second punch 70 is configured to hold the remaining portion of the winding heads in position when bending the first portion of the winding heads 30 of the first wave winding portion. It would also be conceivable to have embodiments in which the second punch 70 is configured to displace a second portion of the winding heads of the wave winding portion to be elastically bent in a second of the two second transverse directions. Then, a first portion of the winding heads 30 of the first wave winding part would be bent upwardly and a second portion would be bent downwardly, and the second wave winding part 16 would be inserted between the deflected portions of the first wave winding part.

The punches 68, 70 may be of different configurations and are shown only schematically in the drawings. For example, each punch may have a series of projections corresponding to the pattern of the portion 32 to be deflected, which engage the corresponding winding heads, and are moved by a common base structure. Also, a series of punches with associated actuator may be provided. The latter has the advantage that the same apparatus 10 can be used to process different patterns of winding heads to be bent, so that wave windings 12 with different layer changes can be produced.

In some embodiments of the apparatus 10, the guide elements 48*a*, 48*b*, 50*a*, 50*b*, 56*a*, 56*b* are movable in groups. In particular, the following are each movable together as groups: the first front guide elements 48*a*, the first rear guide elements 48*b*, the second front guide elements 50*a*, the second rear guide elements 50*b*, the secondary first guide elements 56*a*, and the secondary second guide elements 56*b*. In the embodiments shown, the guide elements 48*a*, 48*b*, 50*a*, 50*b*, 56*a*, 56*b*, which are, for example, pins 60, are linearly movable. In other embodiments not shown, all or some of the guide elements 48*a*, 48*b*, 50*a*, 50*b*, 56*a*, 56*b* are pivotally movable, e.g. arranged on a pivoting cantilever or a rotating unit.

In a preferred embodiment, the apparatus 10 is configured such that each straight wire section 28 or at least each half-wave with two adjacent straight wire sections 28 and a winding head 30 therebetween is guided by at least one guide element 48*a*, 48*b*, 50*a*, 50*b*, 56*a*, 56*b* at any time during the plugging operation.

Figure 25:
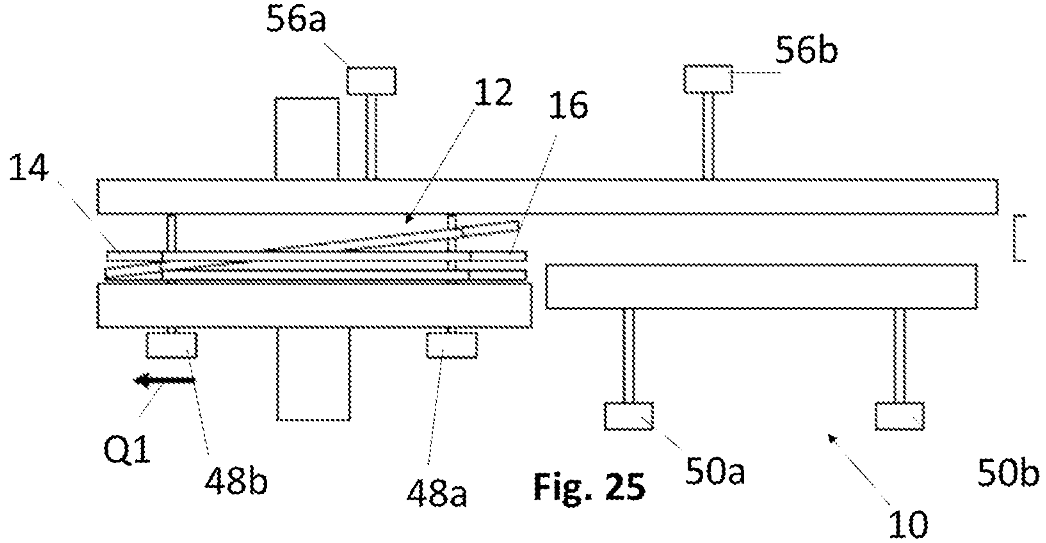

In some embodiments of the apparatus 10, at least some of the guide elements, for example the rear first guide elements 48*b*, are also movable in the first transverse direction Q1, this is shown in particular in FIG. 25.

In the following, a preferred sequence of steps for a preferred embodiment of the method or the program sequence of the control unit 36 will be explained in more detail with reference to the sequence of the illustrations of FIGS. 12 to 25.

In FIGS. 12 to 25, the sequence of the plugging operation with guides is shown in side view. The guide elements 48*a*, 48*b*, 50*a*, 50*b* between the wires 22*a*-22*f* are shown in the following example with pin rows—rows of pins 60. The wires 22*a*-22*f* are guided with at least two guide elements—rows of pins—at any time in the example. In preferred embodiments, at least one guide element—pin row—is always engaged.

According to FIG. 12, the first wave winding part 14 is provided on the first receptacle 18. Besides, the second wave winding part 16 is provided on the second receptacle 34. The first guide elements 48*a*, 48*b*, 50*a*, 50*b* are in the guide position 52. The cover 64 is still removed from the receptacles 18, 34 and the secondary guide elements 56*a*, 56*b* are in the release position 54 so as not to obstruct the provision of the wave winding parts 14, 16.

Figure 13:
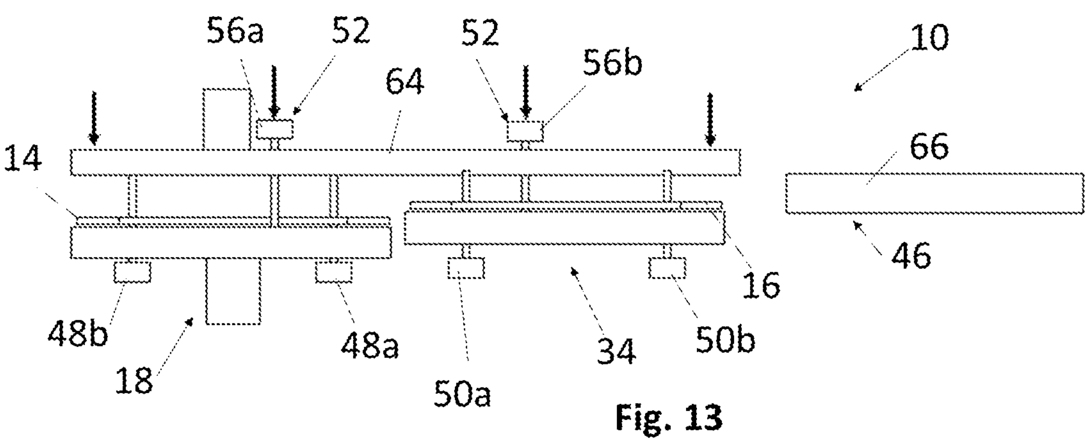
FIGS. 13 to 25 are a view of the device comparable to FIG. 12 in a second to fifteenth step of the process.

According to FIG. 13, the cover 64 is fed. Further, the secondary guide elements 56*a*, 56*b* are fed by moving them downward from the release position 54 to the guide position 52. The first guide elements 48*a*, 48*b*, 56*a* are engaged with the first wave winding part 14. The second guide elements 50*a*, 50*b*, 56*b* are engaged with the second wave winding part.

Figure 14:
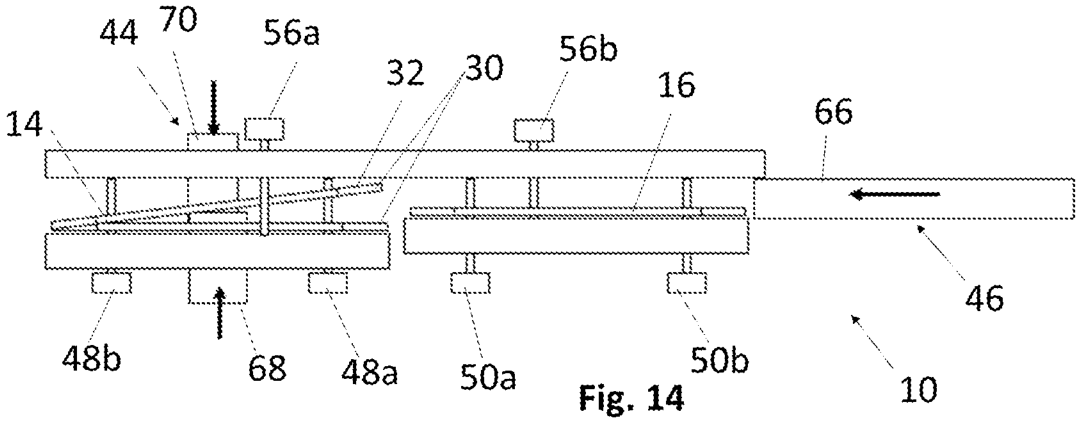

According to FIG. 14, the punches 68, 70 are subsequently fed. The portions 32 of the first wave winding part 14 are elastically bent. The first guide elements 48*a*, 48*b*, 56*a* are engaged with the first wave winding part 14. The second guide elements 50*a*, 50*b*, 56*b* are engaged with the second wave winding part. Further, in the illustrated embodiment, the slider 66 is approached.

Figure 15:
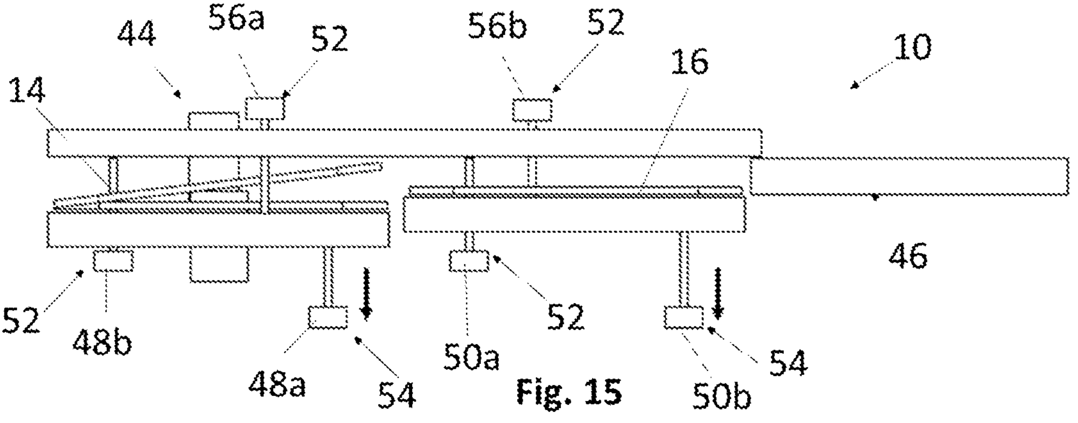

According to FIG. 15, the front first guide elements 48*a* and the rear second guide elements 50*b* are then moved from the guide position 52 to the release position 54, for example by extending the corresponding rows of pins. The rear first guide elements 48*b* and the secondary first guide elements 56*a* are in the guide position 52 and thus in engagement with the first wave winding part 14. The front second guide elements 50*a* and the secondary second guide elements 56*b* are in the guide position 52 and thus in engagement with the second wave winding part 16.

Figure 16:
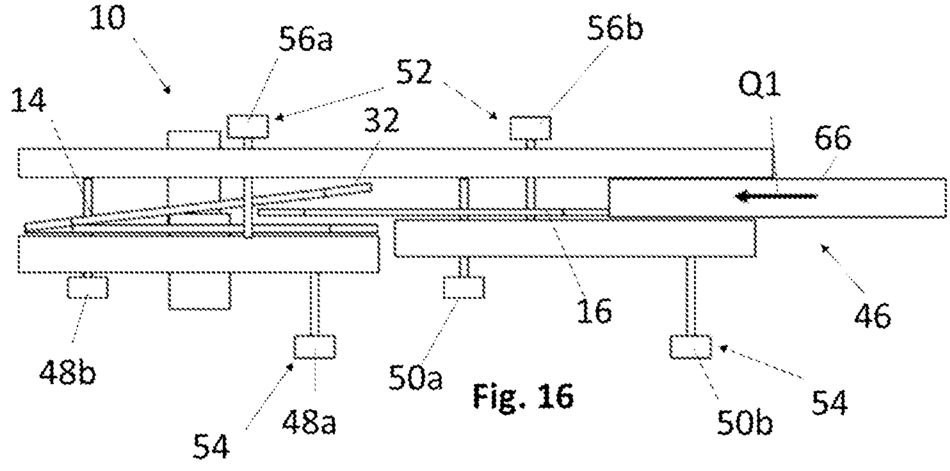

Referring to FIG. 16, the slider 66 of the relative displacement device 46 subsequently pushes the second wave winding part 16 into the first wave winding part 14 up to the position of the front first guide elements. In particular, the second wave winding part 16 is pushed to a position where the front first guide elements 48*a* can engage the second wave winding part 16 behind the winding heads 30 of the second wave winding part 16 facing the first wave winding part. The rear first guide elements 48*b* and the secondary first guide elements 56*a* are in the guide position 52 and thus in engagement with the first wave winding part 14. The front second guide elements 50*a* and the secondary second guide elements 56*b* are in the guide position 52 and thus in engagement with the second wave winding part 16.

Figure 17:
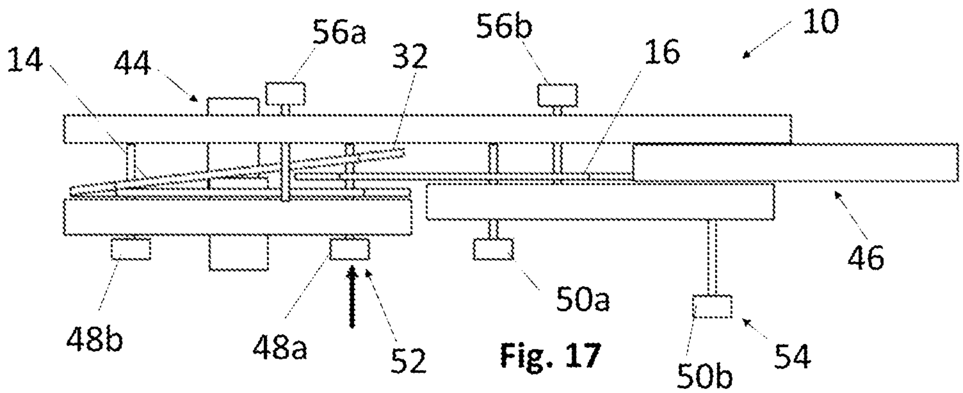

Referring to FIG. 17, the front first guide elements 48*a* are then moved from the release position 54 to the guide position 52 so that they engage the first wave winding part 14 and the second wave winding part 16. This occurs by advancing the row of pins forming the front first guide elements 48*a*. The rear first guide elements 48*b*, the front first guide elements 48*a* and the secondary first guide elements 56*a* are engaged with the first wave winding part 14. The front second guide elements 50*a*, the secondary second guide elements 56*b* and the front first guide elements 48*a* are engaged with the second wave winding part 16.

Figure 18:
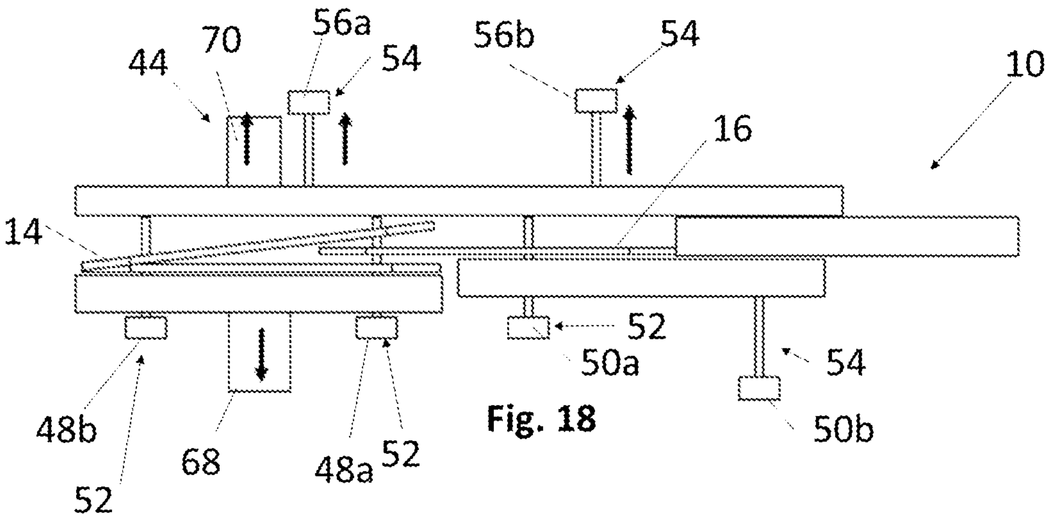

Referring to FIG. 18, the secondary guide elements 56*a* and 56*b* are then moved from the guide position 52 to the release position 54. The punches 68, 70 of the bending device 44 are retracted. The rear first guide elements 48*b* and the front first guide elements 48*a* are engaged with the first wave winding part 14. The front second guide elements 50*a* and the front first guide elements 48*a* are engaged with the second wave winding part 16.

Figure 19:
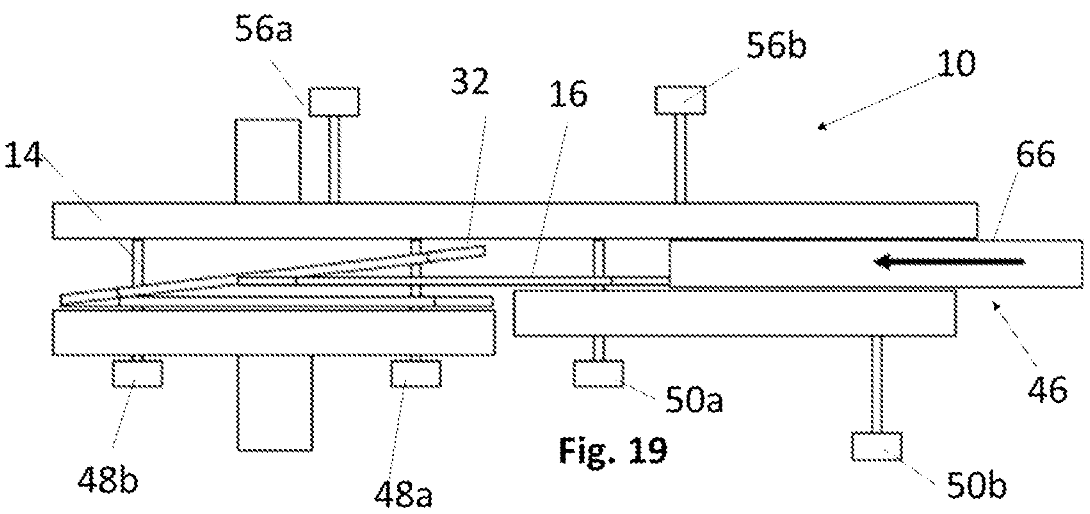

Referring to FIG. 19, the slider 66 of the relative displacement device 46 subsequently pushes the second wave winding part 16 further into the first wave winding part 14 in the first transverse direction Q1 to a position of the secondary first guide elements 56*a*. The insertion is performed to a position where the secondary first guide elements 56*a* can engage the second wave winding part 16 behind the winding heads 30 of the second wave winding part 16 facing the first wave winding part 14. The rear first guide elements 48*b* and the front first guide elements 48*a* are engaged with the first wave winding part 14. The front second guide elements 50*a* and the front first guide elements 48*a* are engaged with the second wave winding part 16.

Figure 20:
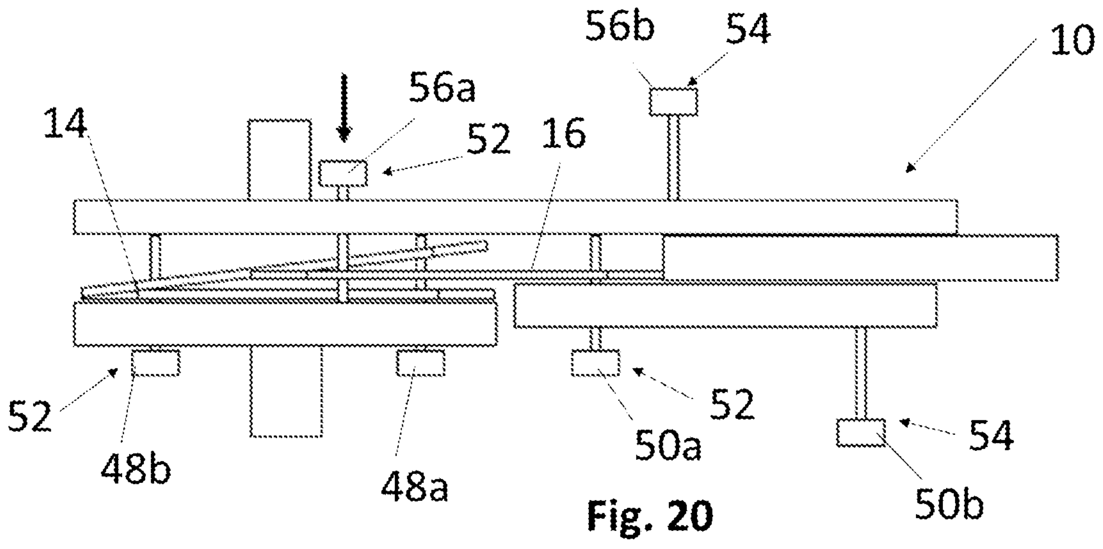

Referring to FIG. 20, the secondary first guide elements 56*a* are then moved from the release position 54 to the guide position 52. The rear first guide elements 48*b*, the secondary first guide elements 56*a*, and the front first guide elements 48*a* are engaged with the first wave winding part 14. The front second guide elements 50*a*, the secondary first guide elements 56*a*, and the front first guide elements 48*a* are engaged with the second wave winding part 16.

Figure 21:
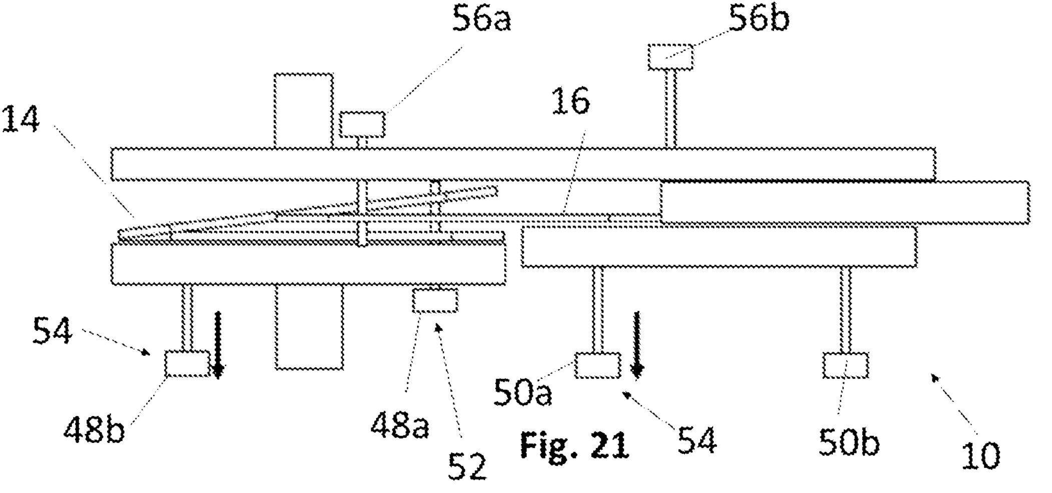

Referring to FIG. 21, the rear first guide elements 48*b* and the front second guide elements 50*a* are then moved from the guide position 52 to the release position. The secondary first guide elements 56*a* and the front first guide elements 48*a* are engaged with the first wave winding part 14. The secondary first guide elements 56*a* and the front first guide elements 48*a* are engaged with the second wave winding part 16.

Figure 22:
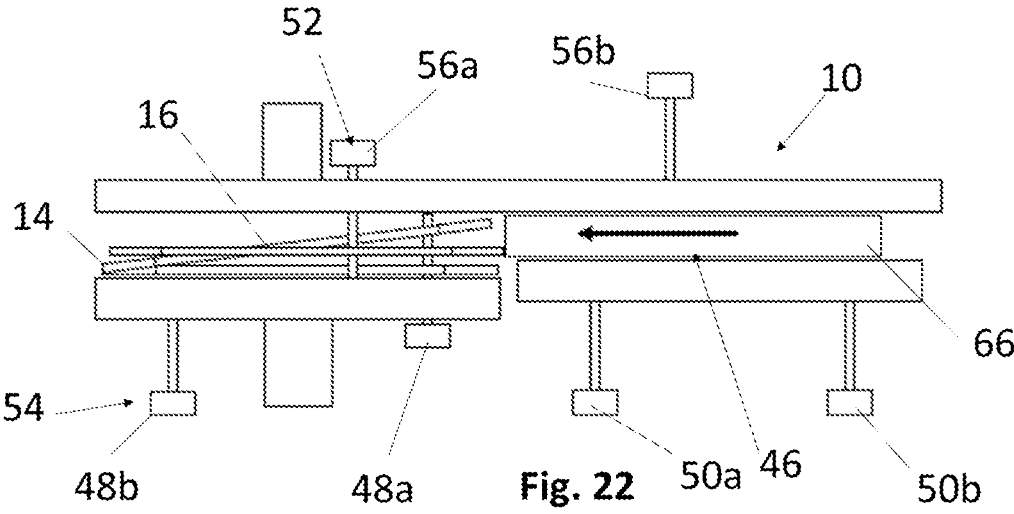

Referring to FIG. 22, the slider 66 then pushes the second wave winding part 16 in the first transverse direction Q1 to the end position. The secondary first guide elements 56*a* and the front first guide elements 48*a* are engaged with the first wave winding part 14. The secondary first guide elements 56*a* and the front first guide elements 48*a* are engaged with the second wave winding part 16.

Figure 23:
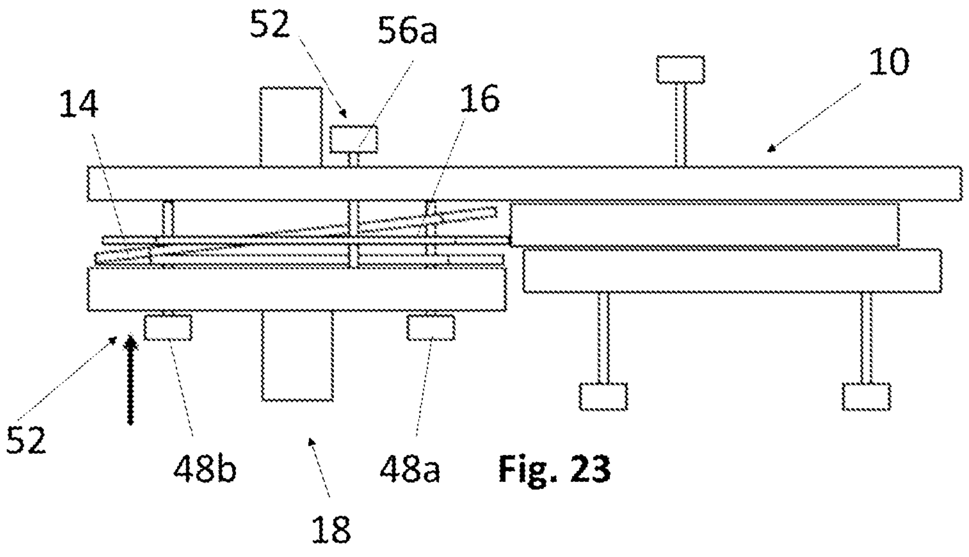

Referring to FIG. 23, the rear first guide elements 48*b* are then moved from the release position 54 to the guide position 52, for example, by retracting the corresponding row of pins. The front first guide elements 48*a*, the rear first guide elements 48*b* and the secondary first guide elements 56*a* are engaged with the first wave winding part 14. The front first guide elements 48*a*, the rear first guide elements 48*b* and the secondary first guide elements 56*a* are engaged with the second wave winding part 16.

Figure 24:
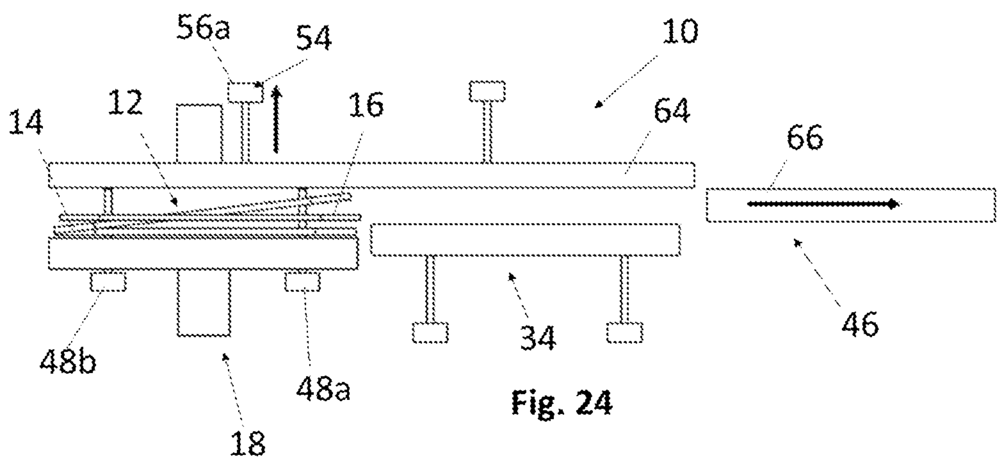

Referring to FIG. 24, the secondary first guide elements 56*a* are then moved, for example, by extending the corresponding row of pins from the guide position 52 to the release position 54. The slider 66 is moved to its home position. The front first guide elements 48*a* and the rear first guide elements 48*b* are in engagement with the first wave winding part 14. The front first guide elements 48*a* and the rear first guide elements 48*b* are in engagement with the second wave winding part 16. Starting from FIG. 24, the wave winding 12 then formed by plugging the wave winding parts 14, 16 is located on the first receptacle 18 and can be moved, for example together with the first receptacle 18 for further processing, for example to a further station for inserting the wave winding 12 into a component of an electrical machine.

Referring to FIG. 25, some of the guide elements, in this case either the front or the rear first guide elements 48*a*, 48*b*, or both the front and the rear guide elements may also be moved in the first transverse direction Q1. By moving the front and/or rear guide elements 48*a*, 48*b*, for example, the wave winding parts 14, 16 or the wave winding 12 formed therefrom can be positioned.

In some embodiments not shown in more detail, the or some of the guide elements 48*a*, 48*b*, 50*a*, 50*b*, 56*a*, 56*b* could be moved in and out not only linearly, but also pivotally.

Although a plugging operation has been described above in which each wave winding part is always guided by two groups of guide elements, it is of course also possible to have embodiments in which at least at times only one group of guide elements engages. Designs with only one guide element in engagement per process step are also conceivable.

The guide elements 48$a$, 48$b$, 50$a$, 50$b$, 56$a$, 56$b$ do not have to be pin-shaped, but other shapes can also be implemented, e.g. circular, rectangular, etc.

By moving primary first guide elements 48$b$ substantially in a first transverse direction, wave winding wires 22$a$-22$f$ as shown in FIG. 25 can be wound between the primary first guide elements 48$a$, 48$b$ as if by a comb to more accurately position the wave winding wires 22$a$-22$f$ in the insertion direction (first transverse direction Q1).

Thus, an apparatus 10 and a method for producing a plugged wave winding 12 by plugging together a first wave winding part 14 with a second wave winding part 16 have been described. In order to automate the plugging operation in a process-safe manner, it is proposed that a first receptacle 18 for receiving the first wave winding part 14 has first guide elements 48$a$, 48$b$ for guiding straight wire sections 28 of the first wave winding part 14, that a second receptacle 34 for receiving the second wave winding part 16 has second guide elements 50$a$, 50$b$ for guiding straight wire sections 28 of the second wave winding part 16, that a bending device 44 for bending portions 32 of at least one of the wave winding parts 14 is designed in such a way that one or more of the winding heads 30 directed towards the other wave winding part 16 are displaced in order to fit the wave winding parts 14, 16 into one another, and that a relative displacement device 46 is formed for pushing the first 14 and second 16 wave winding parts of the wave winding 12 into one another so as to plug the wave winding parts 14, 16, and that the first 48$a$, 48$b$ and/or the second guide elements 50$a$, 50$b$ are movable between a guide position 52 for guiding the straight wire sections 28 and a release position 54 for releasing the path of winding heads 30 in the course of plugging into one another. A corresponding method, preferably computer-implemented, is also proposed.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms “comprise” or “comprising” do not exclude other elements or steps, the terms “a” or “one” do not exclude a plural number, and the term “or” means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

LIST OF REFERENCE SIGNS

10 apparatus
12 wave winding
14 first wave winding part
16 second wave winding part
18 first receptacle
20 wave winding mat
22$a$-22$c$ first wave winding wire
22$d$-22$f$ second wave winding wire
24 first partial mat
26 second partial mat
28 straight wire section
30 winding head
32 portion
34 second receptacle
36 control unit
38 data processing unit
40 memory
42 computer program
44 bending device
46 relative displacement device
48$a$ front first guide element
48$b$ rear first guide element
50$a$ front second guide element
50$b$ rear second guide element
52 guide position
54 release position
56$a$ secondary first guide element
56$b$ secondary second guide element
58 projection
60 pin
62 first rake
63 second rake
64 cover
66 slider
68 first punch
70 second punch
L longitudinal direction
Q1 first transverse direction
Q2 second transverse direction

The invention claimed is:

1. A method of producing a plugged wave winding configured to form at least part of a coil winding for a component of an electrical machine by plugging together a first wave winding part with a second wave winding part, wherein the first wave winding part is formed by at least one first wave winding wire and the second wave winding part is formed by at least one second wave winding wire, wherein the wave winding wires each extend in a longitudinal direction and have straight wire sections extending in a first transverse direction running transverse to the longitudinal direction and roof-shaped winding heads therebetween such that adjacent straight wire sections are interconnected by a winding head bent in a roof shape, the method comprising:

providing the first wave winding part and first guide elements for guiding straight wire sections of the first wave winding part during a plugging operation, providing the second wave winding part and second guide elements for guiding straight wire sections of the second wave winding part during the plugging operation, bending portions of at least one of the wave winding parts such that one or more of the winding heads directed towards the other wave winding part are displaced in a second transverse direction extending transversely to the longitudinal direction and transversely to the first transverse direction for plugging the wave winding parts into one another, and plugging the first and second wave winding parts of the wave winding into one another under guidance of the first and second guide elements by pushing, wherein the first and second guide elements, for passing winding heads during plugging into one another, are moved from a guide position, in which they guide the straight wire sections, to a release position for releasing a path of the winding heads.

2. The method according to claim 1, further comprising at least one of:

guiding a movement of at least one of the wave winding parts during the plugging into one another with primary guide elements extending from one side into the wave winding part to be guided, and secondary guide elements extending from the other side into the wave winding part to be guided, wherein the primary and secondary guide elements are transferred into the release position at different times of the plugging operation so that guiding is permanently provided, or guiding the movement of at least one of the wave winding parts during the plugging into one another with the first and second guide elements as primary guide elements and additionally with secondary guide elements, the primary and secondary guide elements being transferred into the release position at different times of the plugging operation so that guiding is permanently provided.

3. The method according to claim 1, further comprising guiding a movement of at least one of the wave winding parts during the plugging into one another with front guide elements located closer to the other wave winding part and rear guide elements located further away from the other wave winding part, wherein the front and rear guide elements are transferred into the release position at different times of the plugging operation.

4. The method according to claim 1, further comprising that each straight wire section, or at least each half-wave with two adjacent straight wire sections and a winding head in between, is guided by at least one guide element at each time of the plugging operation.

5. The method according to claim 1, further comprising at least one of the following steps:

providing one or more individual wires or partial mats as the first wave winding part and the second wave winding part so that the first and second wave winding parts lie next to each other in the first transverse direction and are aligned with their longitudinal directions relative to each other;

raising or lowering a first portion or a first half of the winding heads of the first wave winding part;

optionally lowering or raising or holding in position a second portion or a second half of the winding heads of the first wave winding part;

pushing the second wave winding part in the first transverse direction into the first wave winding part;

releasing the respective bent portion of the first wave winding part so that the respective bent portion moves back again towards an initial position or moving the respective bent portion of the first wave winding part back towards an initial position;

holding the first wave winding part and guiding the movement of the second wave winding part with the guide elements;

guiding the wave winding part to be guided with several rows of pins movable in a direction of which at least one direction component runs along the center axis of the pin.

6. The method according to claim 1, further comprising aligning at least one of the wave winding parts or the plugged wave winding by moving at least some of the guide elements in the first transverse direction.

7. The method according to claim 5, wherein pushing the second wave winding part guided with the guide elements into the release position only when passing the winding head.

8. A method of producing a plugged wave winding configured to form at least part of a coil winding for a component of an electrical machine by plugging together a first wave winding part with a second wave winding part, wherein the first wave winding part is formed by at least one first wave winding wire and the second wave winding part is formed by at least one second wave winding wire, wherein the wave winding wires each extend in a longitudinal direction and have straight wire sections extending in a first transverse direction running transverse to the longitudinal direction and roof-shaped winding heads therebetween such that adjacent straight wire sections are interconnected by a winding head bent in a roof shape, the method comprising:

providing the first wave winding part and first guide elements for guiding straight wire sections of the first wave winding part during a plugging operation, providing the second wave winding part and second guide elements for guiding straight wire sections of the second wave winding part during the plugging operation, bending portions of at least one of the wave winding parts such that one or more of the winding heads directed towards the other wave winding part are displaced in a second transverse direction extending transversely to the longitudinal direction and transversely to the first transverse direction for plugging the wave winding parts into one another, and pushing the first and second wave winding parts of the wave winding with the guide elements so as to plug the wave winding parts into one another, wherein the first and second guide elements, for passing winding heads during plugging into one another, are moved from a guide position, in which they guide the straight wire sections, to a release position for releasing a path of the winding heads, and the method further comprising at least one of:

guiding a movement of at least one of the wave winding parts during the plugging into one another with primary guide elements extending from one side into the wave winding part to be guided, and secondary guide elements extending from the other side into the wave winding part to be guided, wherein the primary and secondary guide elements are transferred into the release position at different times of the plugging operation so that guiding is permanently provided, or guiding the movement of at least one of the wave winding parts during the plugging into one another with the first and second guide elements as primary guide elements and additionally with secondary guide elements, the primary and secondary guide elements being transferred into the release position at different times of the plugging operation so that guiding is permanently provided.

* * * * *